(12) United States Patent
Schiffmiller et al.

(10) Patent No.: US 10,884,095 B2
(45) Date of Patent: Jan. 5, 2021

(54) GEOLOCATION USING TIME DIFFERENCE OF ARRIVAL AND LONG BASELINE INTERFEROMETRY

(71) Applicant: BAE Systems Information and Electronic Systems Integration Inc., Nashua, NH (US)

(72) Inventors: Richard Schiffmiller, Teaneck, NJ (US); Lawrence Sheldon, Flushing, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 77 days.

(21) Appl. No.: 16/352,404

(22) Filed: Mar. 13, 2019

(65) Prior Publication Data

US 2020/0292655 A1      Sep. 17, 2020

(51) Int. Cl.
*G01S 3/50*      (2006.01)
*G01S 3/48*      (2006.01)

(52) U.S. Cl.
CPC . *G01S 3/50* (2013.01); *G01S 3/48* (2013.01)

(58) Field of Classification Search
CPC ..... G01S 1/02; G01S 3/50; G01S 3/48; G01S 3/36; G01S 3/42; G01S 5/04
USPC ........................................................ 342/424
See application file for complete search history.

(56) References Cited

U.S. PATENT DOCUMENTS

| 4,315,609 | A | * | 2/1982 | McLean | ................... | F41G 7/30 |
| | | | | | | 244/3.14 |
| 5,999,129 | A | | 12/1999 | Rose | | |
| 2009/0079634 | A1 | | 3/2009 | Rose | | |
| 2011/0074631 | A1 | | 3/2011 | Parker et al. | | |
| 2015/0084805 | A1 | * | 3/2015 | Dawber | ................... | G01S 13/28 |
| | | | | | | 342/28 |
| 2015/0287422 | A1 | * | 10/2015 | Short | ...................... | G10L 13/02 |
| | | | | | | 704/205 |

(Continued)

OTHER PUBLICATIONS

Nelder, JA and R Mead, "A Simplex Method for Function Minimization", The Computer Journal, vol. 7, Jan. 1965, pp. 308-313.

(Continued)

*Primary Examiner* — Harry K Liu
(74) *Attorney, Agent, or Firm* — Finch & Maloney PLLC; Scott J. Asmus

(57) ABSTRACT

Techniques are provided for geolocation of a radar emitting source. A methodology implementing the techniques according to an embodiment includes calculating time difference of arrival (TDOAs) of ground emitter radar pulses, within a dwell period, between two long baseline interferometer (LBI) antennas. The TDOA calculations are based on a precision estimate of the time of arrival of the radar pulses. The method further includes calculating an LBI phase wrap disambiguation factor based on (1) the TDOAs, (2) an average of frequencies of the radar pulses within the dwell period, and (3) an average of phase shifts of the radar pulses between the LBI antennas within the dwell period. The method further includes mapping a curve of points onto the surface of the earth based on an LBI cone angle calculation employing the LBI phase wrap disambiguation factor. The curve of points is associated with a geolocation of the ground emitter.

22 Claims, 11 Drawing Sheets

(56) References Cited

U.S. PATENT DOCUMENTS

2016/0061932 A1   3/2016  May
2016/0299212 A1*  10/2016 Broad .................... G01S 5/12
2018/0203094 A1*  7/2018  Gudim .................... G01S 5/04
2018/0306888 A1*  10/2018 Robinson ................ G01S 3/46

OTHER PUBLICATIONS

International Search Report, PCT/US20/22060, dated Jun. 12, 2020, 10 pages.

* cited by examiner

GEOLOCATION USING TIME DIFFERENCE OF ARRIVAL AND LONG BASELINE INTERFEROMETRY

FIELD OF DISCLOSURE

The present disclosure relates to geolocation, and more particularly, to geolocation using precision time difference of arrival (TDOA) and long baseline interferometry (LBI).

BACKGROUND

Passive geolocation of a ground-based radar emitter is a useful and important capability for an aircraft. Passive geolocation has the advantage of operating in a listening only mode which reduces risk of detection of the aircraft and allows for a less complex and more cost-effective system. Existing passive geolocation systems, however, suffer from phase ambiguities between the signals received at multiple antennas, and thus can generate many possible potential geolocation solutions. As such, many seconds of data collection are typically required to achieve sufficient true bearing spread to properly locate the emitter.

Figure 1:
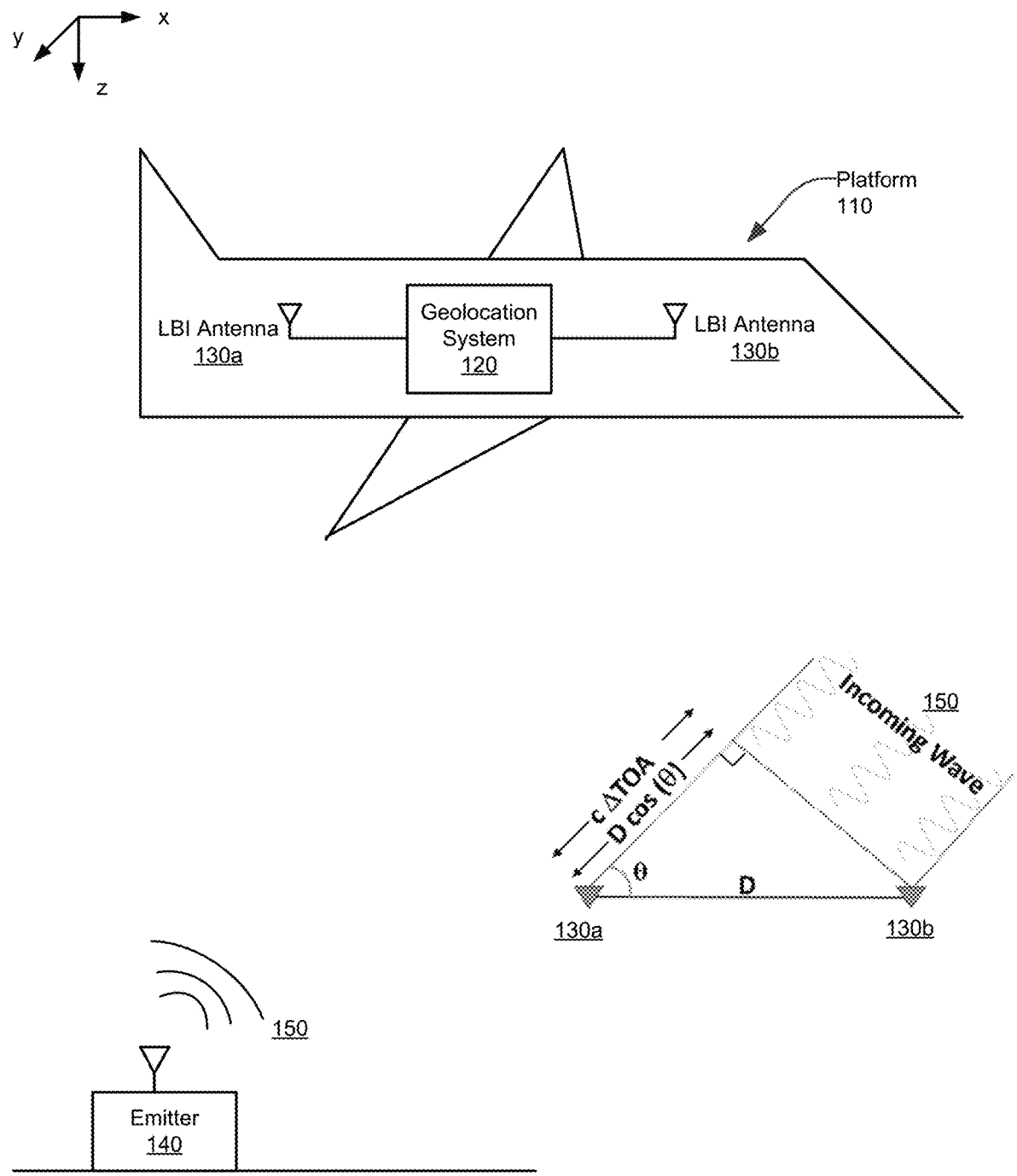
FIG. 1 illustrates deployment of a geolocation system on an airborne platform, configured in accordance with certain embodiments of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for passive geolocation of a ground-based radar emitting source, using a synergistic approach between direction finding and geolocation which combines long baseline interferometry (LBI) measurements with high precision time difference of arrival (TDOA) measurements. The disclosed techniques operate on data samples collected by a digital receiver, from two antennas, to measure time of arrival (TOA) of the radar pulse at each antenna, to better than one nanosecond accuracy, at typically encountered signal-to-noise ratios. The precision TOA is used to calculate a TDOA between the two antennas, which is then employed in an LBI calculation to resolve the phase ambiguity inherent in LBI. In some embodiments, particularly with longer antenna baselines, the precision TDOA may be used on its own to locate the emitter, without relying on LBI. In some further embodiments, a precise measurement of the radar pulse rise time may also be used as a discriminant to classify the radar emitter and/or to cluster pulses from a single emitter.

The disclosed techniques can be implemented, for example, in a computing system or a software product executable or otherwise controllable by such systems, although other embodiments will be apparent. The system or product is configured to provide geolocation of a ground emitter. In accordance with an embodiment, a methodology to implement these techniques includes calculating time difference of arrival (TDOAs) of ground emitter radar pulses, within a dwell period, between two long baseline interferometer (LBI) antennas. The TDOA calculations are based on a precision estimate of the time of arrival of the radar pulses. The method further includes calculating an LBI phase wrap disambiguation factor based on (1) the TDOAs, (2) an average of frequencies of the radar pulses within the dwell period, and (3) an average of phase shifts of the radar pulses between the LBI antennas within the dwell period, as will be described in greater detail below. The method further includes mapping a curve of points onto the surface of the earth based on an LBI cone angle calculation employing the LBI phase wrap disambiguation factor. The curve of points is associated with a geolocation of the ground emitter. The method further includes repeating the process for multiple dwell periods to generate multiple such curves, each of which is a candidate for the emitter location, and finding an intersection of those curves to locate the ground emitter.

It will be appreciated that the techniques described herein may provide geolocation of a ground emitter with increased accuracy and reduced data collection time, compared to existing techniques that suffer from interferometer phase ambiguity. Other applications will be apparent. These techniques may further be implemented in hardware or software or a combination thereof.

FIG. 1 illustrates deployment 100 of a geolocation system 120 on an airborne platform 110, such as an aircraft, drone or projectile, configured in accordance with certain embodiments of the present disclosure. The airborne platform, or aircraft, is shown to host a geolocation system 120 coupled to two LBI antennas 130a and 130b that are separated by a distance or baseline D. In some embodiments, D may be on the order of 40 feet. In some other embodiments, D may be shorter, for example on the order of 10 feet, to allow for applications on smaller platforms, although a reduction in geolocation accuracy may result. The geolocation system 120 is configured to locate a ground-based pulsed radar emitter 140 based on time difference of arrival of the emitted radar signals 150 at the two antennas 130a and 130b. In some embodiments, the geolocation process also incorporates long baseline interferometry calculations, as will be explained in greater detail below. FIG. 1 also illustrates the geometry associated with the manner in which the incoming wave 150, arriving at an angle θ relative to the baseline, impinges on the antennas 130a and 130b. At that angle, the wavefront travels an additional distance of D cos(θ) to reach antenna 130a relative to antenna 130b. That distance is typically long enough to correspond to many cycles of the carrier frequency of the radar pulse and thus the total phase difference along that distance is called the unwrapped phase, which is ambiguous to within some number of multiples of 2π.

This additional distance is also represented by c ΔTOA, where c is the speed of light. Thus, an accurate determination of TDOA of the radar pulse allows for an estimation of θ, which can be used to disambiguate the phase wrap and, in combination with knowledge of the position and orientation of the platform 110, can be used to locate the emitter 140, as will be described in greater detail below.

Figure 2:
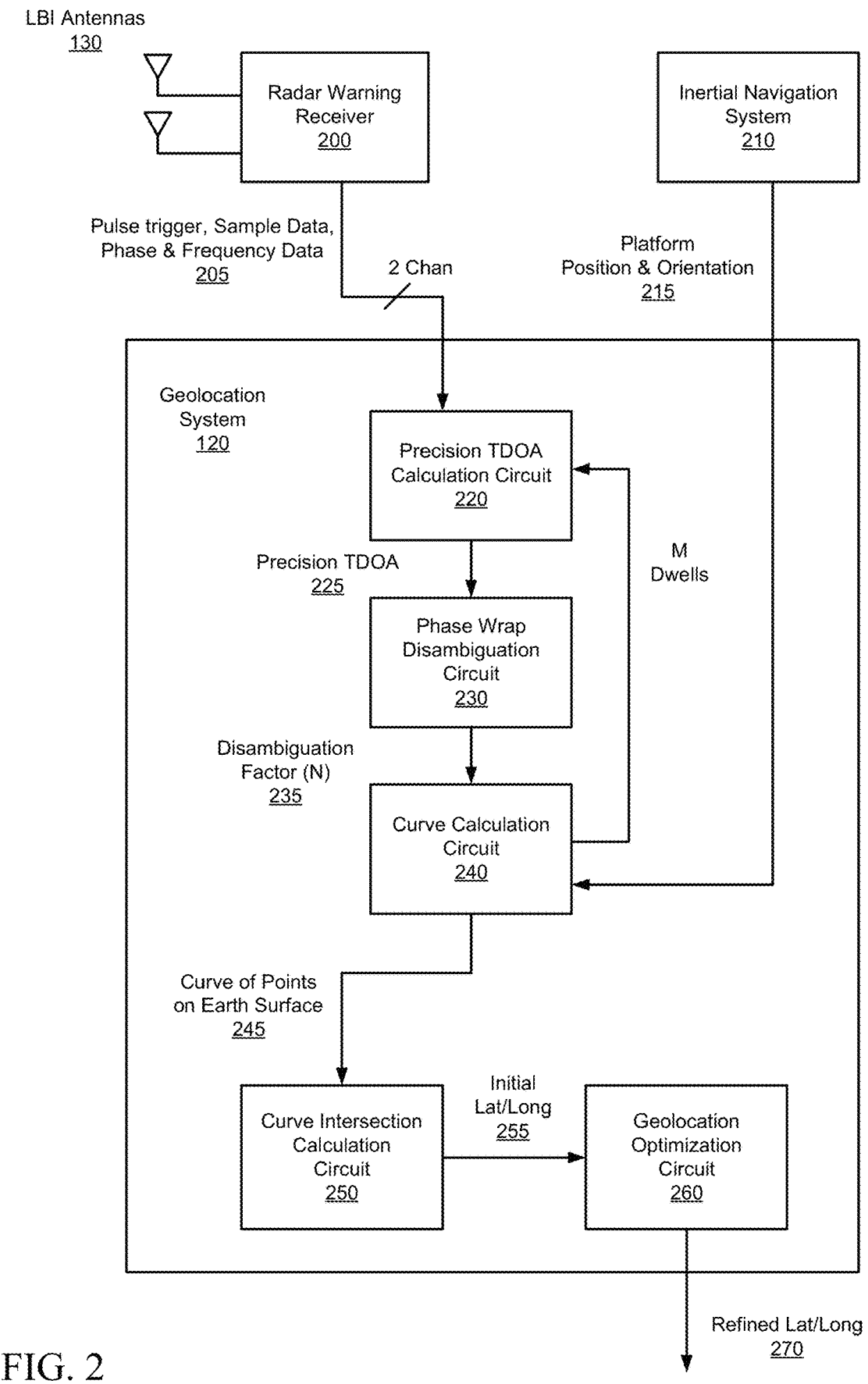
FIG. 2 is a top-level block diagram of a geolocation system, configured in accordance with certain embodiments of the present disclosure.

FIG. 2 is a top-level block diagram of a geolocation system 120, configured in accordance with certain embodiments of the present disclosure. The geolocation system 120 is shown to include a precision TDOA calculation circuit 220, a phase wrap disambiguation circuit 230, a curve calculation circuit 240, a curve intersection calculation circuit 250, and a geolocation optimization circuit 260. Also shown are LBI antennas 130, radar warning receiver (or other suitable digital receiver) 200, and inertial navigation system 210.

The radar warning receiver 200 is configured to collect and buffer raw data samples from the antennas 130 and to generate a trigger upon detection of a radar pulse so that the geolocation system 120 can process the buffered data samples over a time interval that contains both pre-trigger samples and post trigger samples, as will be explained in greater detail below. The radar warning receiver also provides phase and frequency data associated with the raw data samples, for processing by the geolocation system 120.

Inertial navigation system 210 is configured to provide platform position and orientation 215, which is used for calculating curve intersections with the earth surface as will be described in greater detail below.

The precision TDOA calculation circuit 220 is configured to generate a relatively precise time difference of arrival of the radar pulse with respect to the two antennas 130. In some embodiments, the calculated TDOA can achieve sub-nanosecond accuracy. The operation of the precision TDOA calculation circuit 220 will be explained below in connection with FIGS. 3 and 4.

The phase wrap disambiguation circuit 230 is configured to calculate the number (N) of 2π ambiguities in the LBI based on an average of the precision TDOAs provided by circuit 220, and an average of the frequencies and phase shifts of the pulses in the dwell period. The frequency and phase data associated with the pulses may be provided by the radar warning receiver 200. In some embodiments, N may be calculated according to the following equation.

$$N = \text{round}(\text{frequency}_{avg} * \text{TDOA}_{avg} - \Delta\text{Phase}_{avg}/2\pi)$$

The curve calculation circuit 240 is configured to calculate an LBI cone angle θ, based on the disambiguation factor N, and to calculate a curve based on the cone angle θ, and to project that curve onto the surface of the earth. The operation of curve calculation circuit 240 will be explained in greater detail below in connection with FIG. 6.

The curve intersection calculation circuit 250 is configured to calculate an initial estimate of the intersection of the curves calculated from multiple dwell periods, and thus an initial estimate of the geolocation of the ground emitter. The operation of curve intersection calculation circuit 250 will be explained in greater detail below in connection with FIG. 8.

The geolocation optimization circuit 260 is configured to refine the initial estimate of the intersection of the curves, and thus the geolocation of the ground emitter, using a Nelder-Mead (NM) optimization. The NM optimization is configured to minimize a cost function which may be expressed, in this geolocation application, as:

$$\text{abs}(\cos(\text{hypothesized } \theta) - \cos(\text{measured } \theta)).$$

NM is a simplex algorithm that does not require any derivatives and is known to converge quickly to a solution. The cost function for NM compares the cosine of the measured cone angle to the cosine of the hypothesized cone angle that would result if the emitter were at the launch point of the algorithm. The total cost is the sum of the squares of those differences over all of the pulses collected. NM iterates the candidate location until it finds a location that minimizes the cost function below a threshold value. In some embodiments, other suitable types of gradient descent minimization algorithms may be used as an alternative to the NM optimization.

Figure 3:
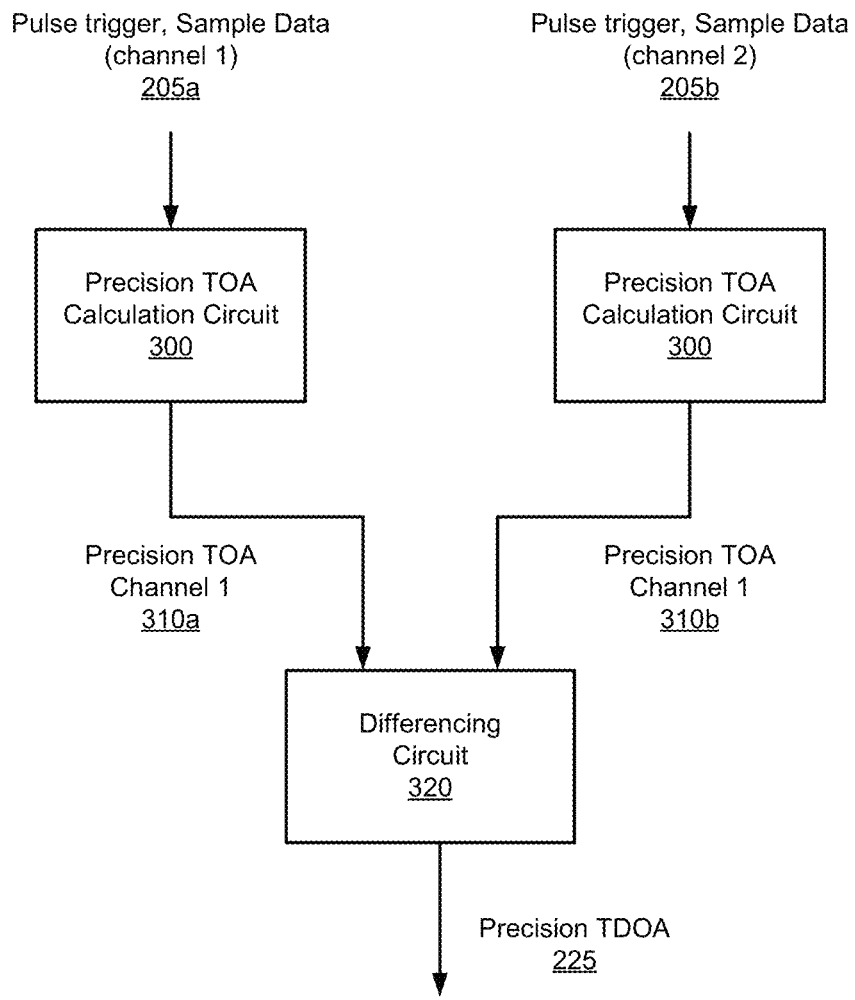
FIG. 3 is a block diagram of a precision TDOA calculation circuit, configured in accordance with certain embodiments of the present disclosure.

FIG. 3 is a block diagram of a precision TDOA calculation circuit 220, configured in accordance with certain embodiments of the present disclosure. The precision TDOA circuit 220 is shown to include a precision TOA calculation circuit 300 to calculate the time of arrival 310a and 310b of the radar pulse for each channel 205a and 205b. The operation of the precision TDOA circuit 220 is described in greater detail below in connection with FIG. 4. The precision TDOA circuit 220 is also shown to include a differencing circuit 320 to calculate the difference between the two arrival times 225.

Figure 4:
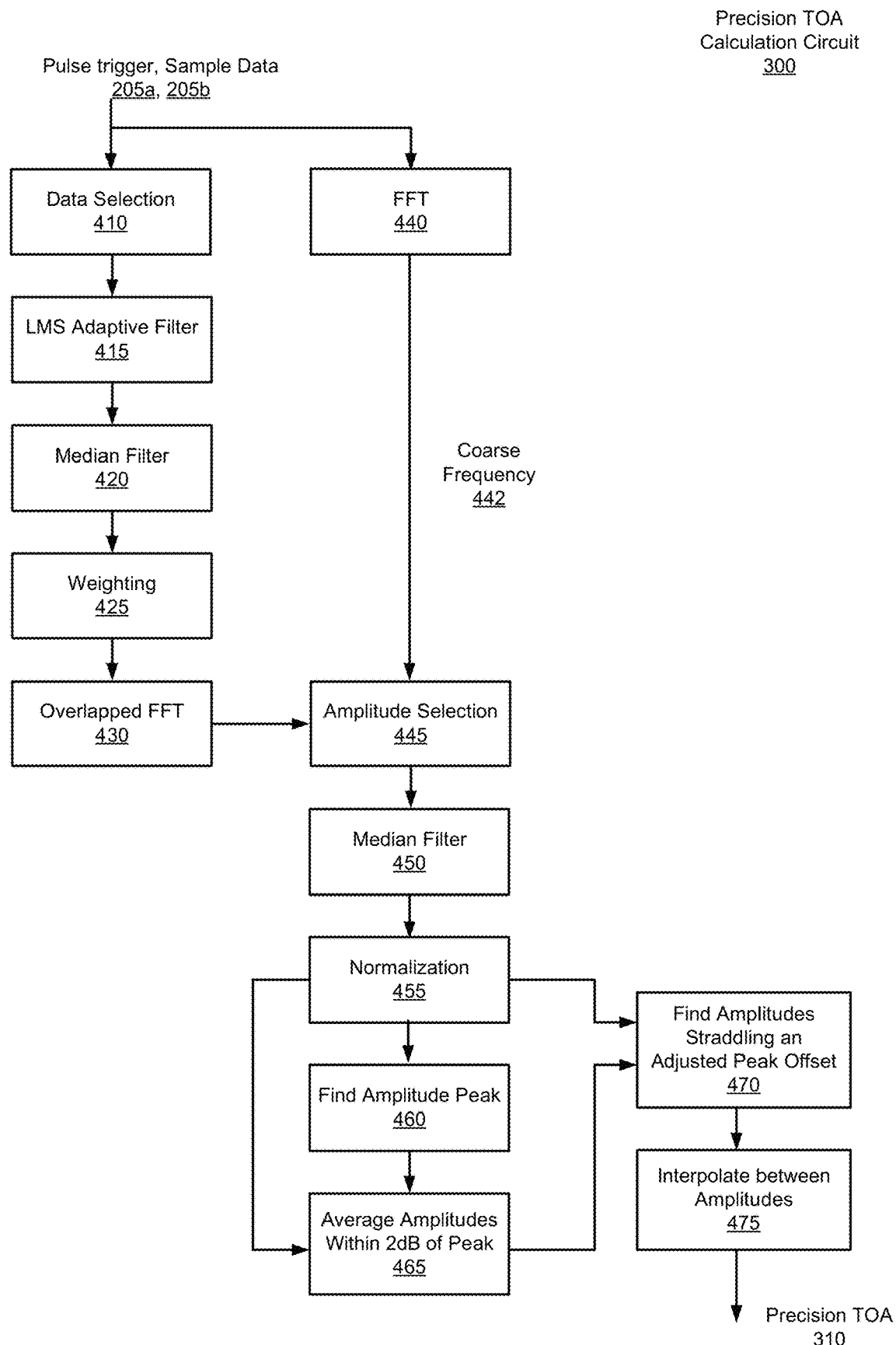
FIG. 4 is a block diagram of a precision TOA calculation circuit, configured in accordance with certain embodiments of the present disclosure.

FIG. 4 is a block diagram of a precision TOA calculation circuit 300, configured in accordance with certain embodiments of the present disclosure. The precision TOA calculation circuit 300 is configured to perform a number of operations to determine the time of arrival of the radar pulse, which will be described in detail as follows. In some embodiments, the time of arrival of the radar pulse may be determined with sub-nanosecond accuracy.

Figure 5:
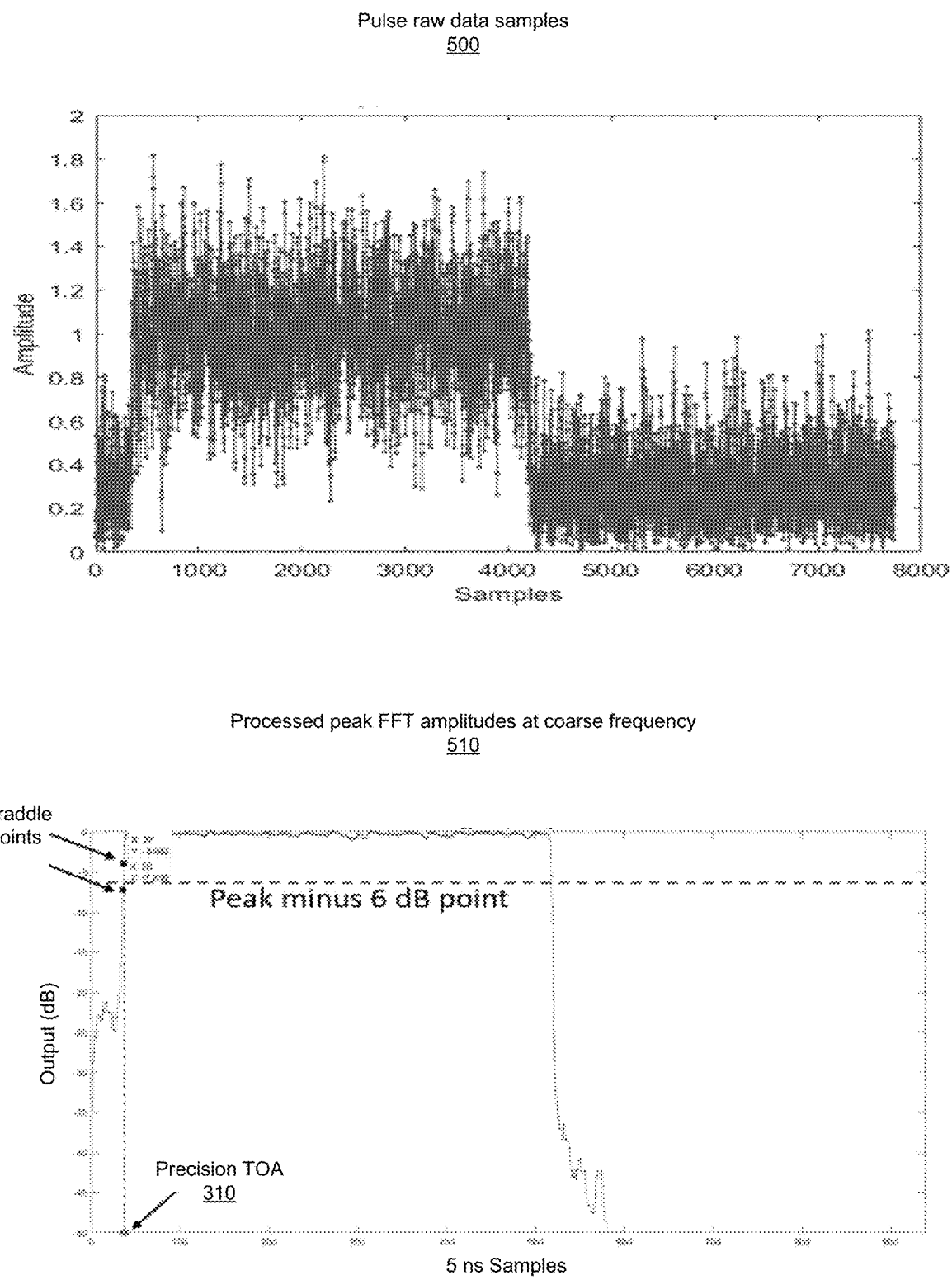
FIG. 5 illustrates a radar pulse and interpolation of time of arrival from a processed signal, in accordance with certain embodiments of the present disclosure.

Analog to digital converters in the radar warning receiver 200 generate a stream of raw digital data samples (for each antenna/channel) which in one example are saved to a buffer. An example plot 500 of the raw data samples of a radar pulse is shown in FIG. 5. The radar warning receiver 200 also generates a trigger 205a upon detection of a radar pulse. At operation 410, sample data 205b is collected from the buffer, in response to the pulse trigger, over a selected time range that covers a period before and after the start of the radar pulse. In some embodiments, the selected time range covers approximately 1 μs of samples before the trigger point and 0.6 μs of samples after the trigger point.

At operation 440, a fast Fourier transform (FFT) is performed on the collected data to generate a coarse frequency estimate 442 of the radar pulse signal.

At operation 415, the signal-to-noise ratio (SNR) of the collected data is enhanced by applying a least mean square (LMS) adaptive filter to minimize the mean square error between the pulse signal plus noise and the noise only signal. Correlated samples of the data collected in an adjacent frequency bin (i.e., adjacent to the bin corresponding to the estimated coarse frequency) are used to represent the noise only signal.

At operation 420, a median filter is applied to the LMS filtered data to smooth the data. At operation 425, a weighting function is applied to the smoothed data in preparation for the following FFT operations.

At operation 430, overlapped FFTs are performed on the data. In some embodiments, a 24-point FFT with six folds is performed on every 5 nanoseconds of data, wherein the FFTs overlap by 95%. The folding enhances skirt selectivity of the FFT result. In this example, each FFT result represents 5 nanoseconds of data.

At operation 445, for each of the FFT results, the FFT amplitude, at the frequency bin corresponding to the previously computed coarse frequency, is stored. At operation 450, those stored amplitudes, collected from all of the FFTs, are passed through a median filter. At operation 455, the median filtered FFT amplitudes are converted to dB and normalized to 0 dB. An example plot 510 of the normalized processed FFT amplitudes (at the coarse frequency) over time is shown in FIG. 5. This signal (plot 510) referred to herein as the "processed pulse."

At operation 460, an amplitude peak of the processed pulse is found, and at operation 465, a mean is calculated over all of the samples of the processed pulse that are within a threshold value of the amplitude peak. This mean value is referred to as the "adjusted peak value." In some embodiments, the threshold value is 2 dB.

At operation 470, an adjusted peak offset is determined. In some embodiments, the adjusted peak offset is 6 dB below the adjusted peak value. A first sample and a second sample are then found which straddle the adjusted peak offset, the first sample immediately preceding the sample time associated with the adjusted peak offset, the second sample immediately following the sample time associated with the adjusted peak offset.

At operation 475, linear interpolation is employed on the first sample and the second sample to determine the time at which the adjusted peak offset occurs. This time is then provided as the precision TOA 310.

Figure 6:
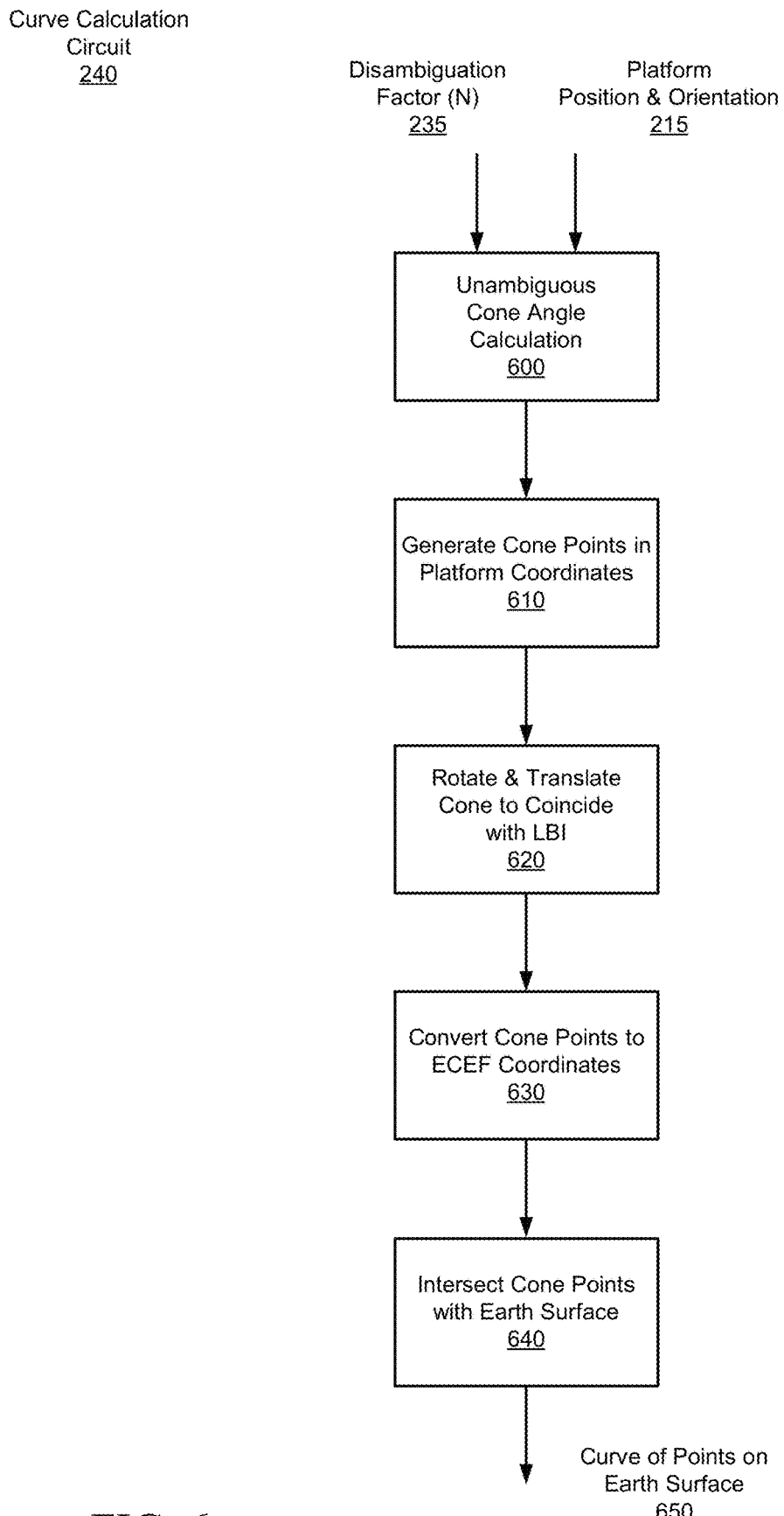
FIG. 6 is a block diagram of a curve calculation circuit, configured in accordance with certain embodiments of the present disclosure.

FIG. 6 is a block diagram of a curve calculation circuit 240, configured in accordance with certain embodiments of the present disclosure. The curve calculation circuit 240 is configured to perform a number of operations, which will be described in detail below, to calculate a curve based on the cone angle θ, and project it onto the surface of the earth.

At operation 600, an unambiguous cone angle is calculated based on the disambiguation factor N, along with the average of frequencies and phase shifts of pulses in the dwell period. In some embodiments, the unambiguous cone angle may be calculated according to the following equation.

$$\text{cone\_angle} = a\cos\left(\frac{c}{2\pi * frequency_{avg} * D} * (\Delta Phase_{avg} + 2\pi * N)\right)$$

At operation 610, cone points are generated in platform (body) coordinates (e.g., x, y, z, as illustrated in FIG. 1). The cone may be described by the following equation:

$$X_{body} = \frac{\sqrt{Y_{body}^2 + Z_{body}^2}}{\tan(\text{cone\_angle})}$$

At operation 620, the cone is rotated and translated to coincide with the LBI (e.g., the cone is oriented along the interferometer axis and offset to the proper antenna location), using known geometric transformation techniques, in light of the present disclosure. At operation 630, the cone points are converted to Earth-centered, Earth-fixed (ECEF) coordinates, using platform position and orientation data 215 provided by the inertial navigation system 210.

At operation 640, the cone points are intersected with the surface of the earth to generate a candidate curve of points on the earth's surface 650, along which the emitter may be located. An equation of the earth ellipsoid may be represented as:

$$\frac{X^2 + Y^2}{a^2} + \frac{Z^2}{b^2} = 1$$

where a is the equatorial radius and b is the polar radius of the earth, and where X, Y, and Z are the ECEF coordinates. The ECEF coordinates of the cone are used for X, Y, and Z in the following equation:

$$\frac{X^2 + Y^2}{a^2} + \frac{Z^2}{b^2} - 1 < tol$$

where tol is a small number (e.g., 5e−6). The cone coordinates that satisfy this inequality are those that intersect the earth's surface.

A curve is thus generated which intersects the earth's surface, based on TDOA calculations of radar pulses that are processed within one dwell period. This process may be repeated for multiple (M) dwell periods to generate M candidate curves.

Figure 7:
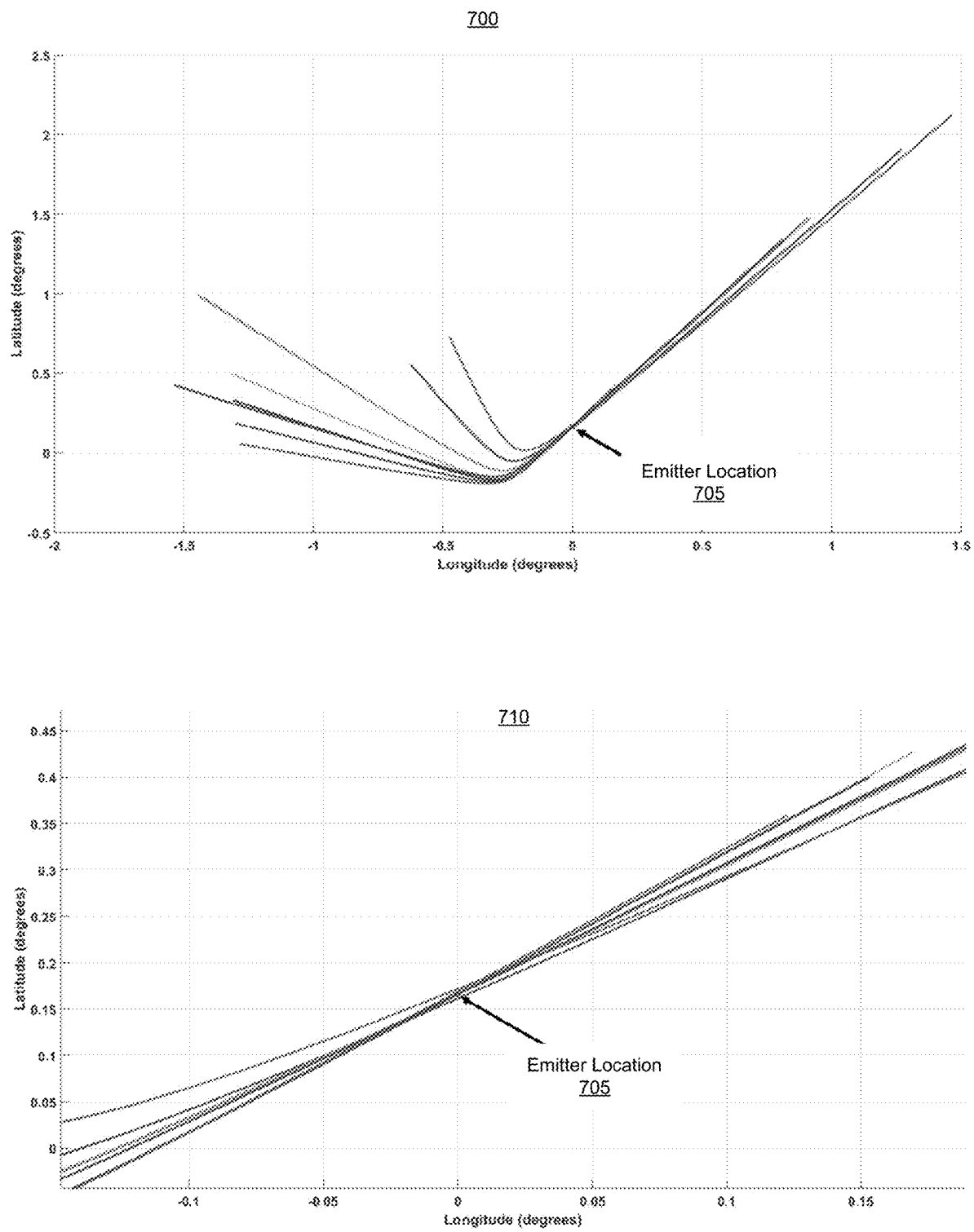
FIG. 7 illustrates calculated curves associated with an emitter location, in accordance with certain embodiments of the present disclosure.

FIG. 7 illustrates calculated curves associated with an emitter location, in accordance with certain embodiments of the present disclosure. Plot 700 shows ten candidate curves (some of which overlap), each curve generated from processing of radar pulses in one of ten dwell periods. Each curve is mapped to the earth's surface, in units of latitude and longitude, and the intersection of the curves coincides with the emitter location 705. Plot 710 is a zoomed in version of plot 700, in which it can be seen that the ten curves do not precisely intersect at one point, and thus additional processing may be performed (e.g., using NM optimization, as previously described) to find an optimal intersection point that will refine the estimated emitter location.

Figure 8:
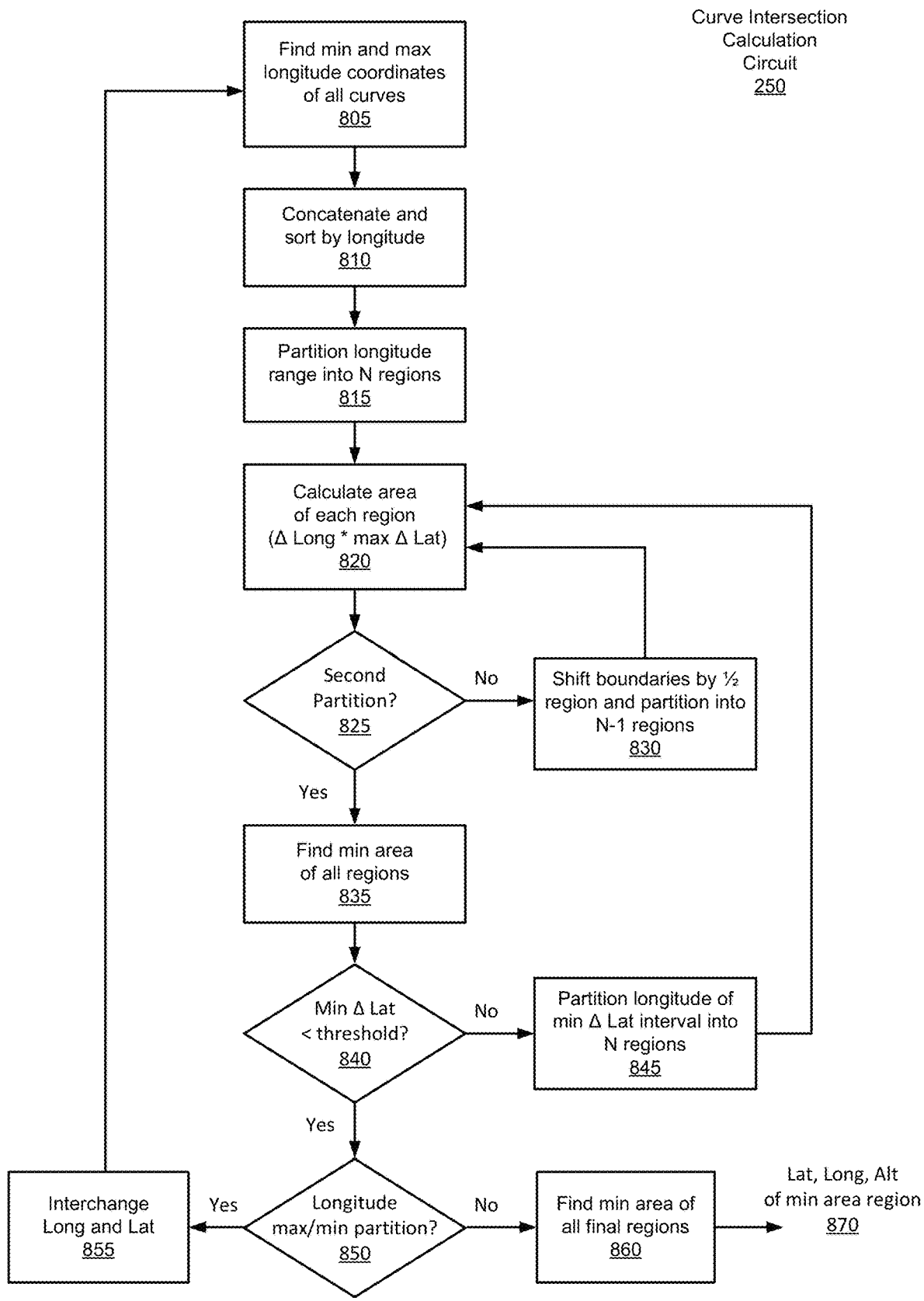
FIG. 8 is a block diagram of a curve intersection calculation circuit, configured in accordance with certain embodiments of the present disclosure.

FIG. 8 is a block diagram of a curve intersection calculation circuit 250, configured in accordance with certain embodiments of the present disclosure. The curve intersection calculation circuit 250 is configured to perform a number of operations to calculate an initial estimate of the intersection of the curves (and thus the latitude, longitude, and altitude of the emitter location), which will be described in detail as follows.

At operation 805, the minimum and maximum longitude coordinates are found for all of the curves. Only the longitude points that are common to all curves are used (along with the corresponding latitude and altitude coordinates).

At operation 810, the latitude, longitude, and altitude coordinates for all of the curves are concatenated separately and then sorted by longitude. At operation 815, the longitude range is partitioned into N regions. In some embodiments, N may be set to 10.

At operation 820, for each region, the maximum spread of latitude is found, and the area for that region is calculated as the longitude spread multiplied by the maximum latitude spread, after converting the angle spreads to nautical miles.

At operation's 825 and 830, the process is repeated with a new partitioning of N−1 regions shifted by one half of a region width to update the boundaries.

At operation 835, the minimum area of all of the regions is found, and that region is selected. At operation 840, if the width of the selected region is not narrower than the threshold value, then the longitudes of the selected region are repartitioned into N new regions and the process is iterated (returning to operation 820).

At operations 850 and 855, the latitude and longitude are interchanged and the process is repeated (returning to operation 805). Then, at operation 860, the latitude, longitude, and altitude of the region associated with the overall smallest area is output as the initial intersection estimate 870 associated with an initial estimate of latitude, longitude, and altitude of the emitter.

Figure 9:
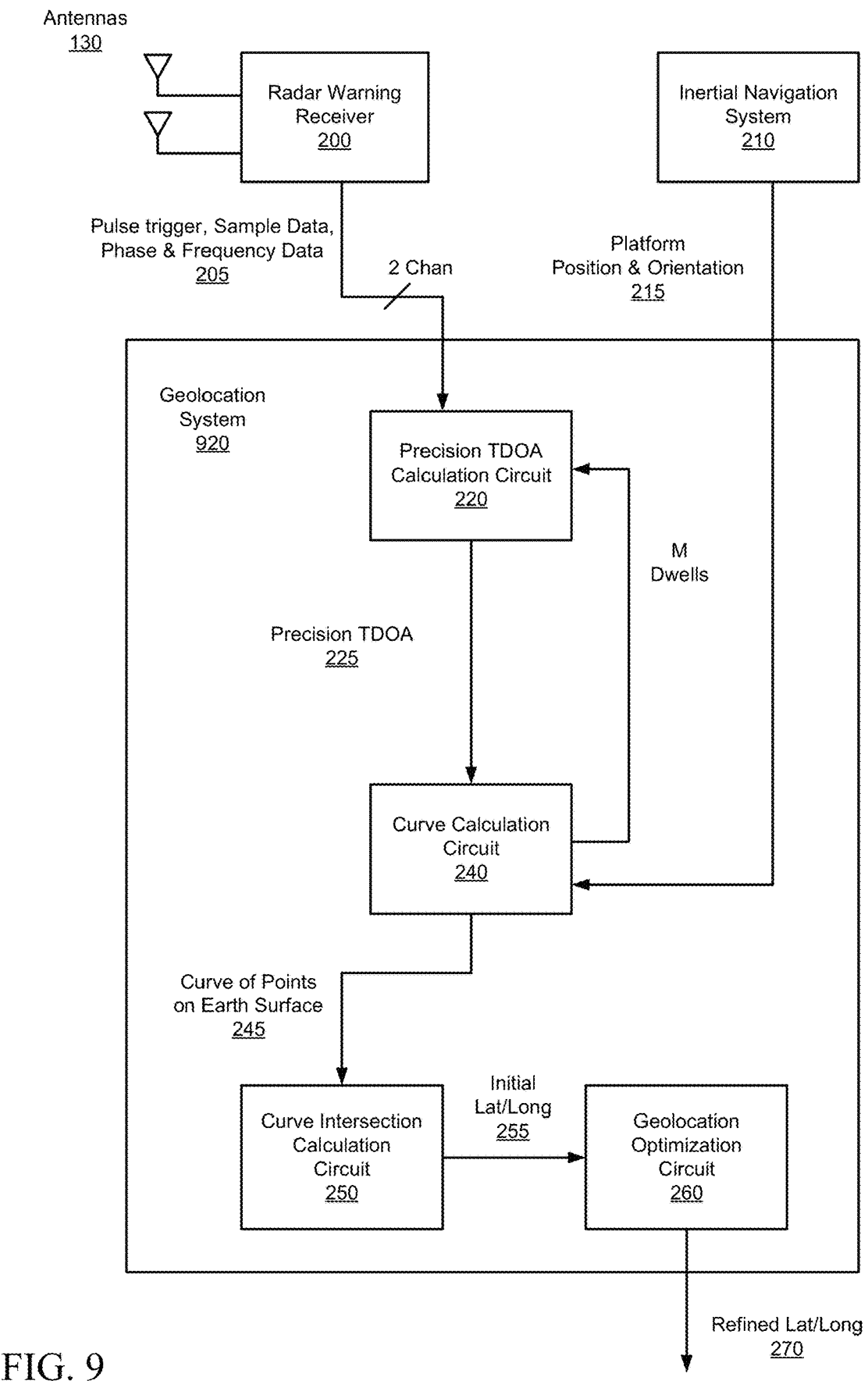
FIG. 9 is a top-level block diagram of a geolocation system, configured in accordance with certain other embodiments of the present disclosure.

FIG. 9 is a top-level block diagram of a geolocation system 920, configured in accordance with certain other embodiments of the present disclosure. The system in this embodiment is similar to the system illustrated in FIG. 2, with the exception that only the precision TDOA calculation is used to calculate the curves and LBI is not needed. For platforms where the antenna baseline (i.e., the distance between antennas, D) is sufficiently long, the cone angle calculation may be based on an average of the TDOAs within the dwell period without relying on LBI calculations. As previously noted, $D \cos(\theta) = c \Delta TOA$, which can be differentiated to yield $-D \sin(\theta)^* d\theta = c^* d(\Delta TOA)$. As such, the error in $\theta$ (i.e., $d(\theta)$), is small for small TDOA measurement error, $d(\Delta TOA)$, and small for large D. In such case, where D is sufficiently long for a given acceptable or tolerable error in $\theta$, the cone angle can be calculated as:

$$\text{cone\_angle} = a \cos\left(\frac{c * TDOA_{avg}}{D}\right)$$

Methodology

Figure 10:
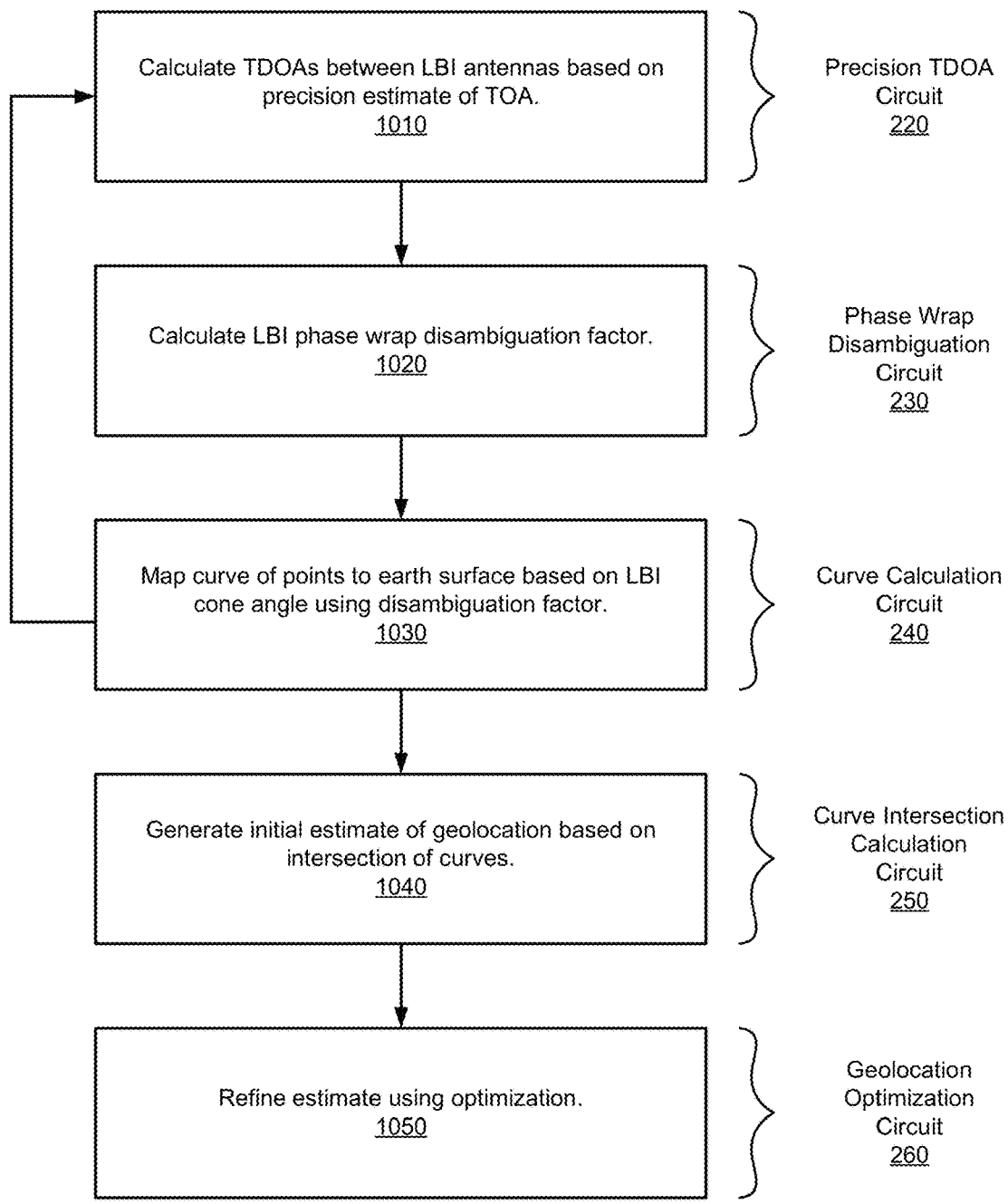
FIG. 10 is a flowchart illustrating a methodology for emitter geolocation, in accordance with certain other embodiments of the present disclosure.

FIG. 10 is a flowchart illustrating a methodology for emitter geolocation, in accordance with certain other embodiments of the present disclosure. As can be seen, example method 1000 includes a number of phases and sub-processes, the sequence of which may vary from one embodiment to another. However, when considered in the aggregate, these phases and sub-processes form a process for emitter geolocation based on precision TOA estimation, in accordance with certain of the embodiments disclosed herein. These embodiments can be implemented, for example using the system architecture illustrated in FIGS. 1-4, 6, 8, and 9, as described above. However other system architectures can be used in other embodiments, as will be apparent in light of this disclosure. To this end, the correlation of the various functions shown in FIG. 10 to the specific components illustrated in FIGS. 1-4, 6, 8, and 9 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 10, in one embodiment method 1000 commences, at operation 1010, by calculating a plurality of TDOAs of ground emitter radar pulses, within a dwell period, between two long baseline interferometer (LBI) antennas. The TDOA calculations are based on a precision estimate of the time of arrival of the radar pulses at each antenna.

Next, at operation 1020, an LBI phase wrap disambiguation factor is calculated based on the TDOAs, an average of frequencies of the radar pulses within the dwell period, and on an average of phase shifts of the radar pulses between the LBI antennas within the dwell period.

At operation 1030, a curve of points is mapped onto the surface of the earth based on an LBI cone angle calculation employing the LBI phase wrap disambiguation factor. The curve of points is associated with the geolocation of the ground emitter, for example the ground emitter should lie on or close to the curve.

At operation 1040, an initial estimate of the geolocation of the ground emitter is generated based on an intersection of the plurality of curves of points calculated for each dwell period. At operation 1050, the estimate is refined using a Nelder-Mead optimization to minimize a TDOA/LBI cost function.

Of course, in some embodiments, additional operations may be performed, as previously described in connection with the system. These additional operations may include, for example, calculating a radar pulse rise time based on the pulse 10 percent and 90 percent points, which correspond to the one and 20 dB points of the waveform. The one and 20 dB points may be interpolated and determined using the disclosed techniques as described above to determine the TOA. In some embodiments, other suitable pulse points (as an alternative to one dB and 20 dB) may be selected to determine the rise time. The radar pulse rise time may then be used to classify the ground emitter.

In some embodiments, for example for long antenna baselines relative to the TDOA measurement error times the speed of light, the cone angle calculation may be based on an average of the TDOAs within the dwell period without relying on LBI calculations.

Example Platform

Figure 11:
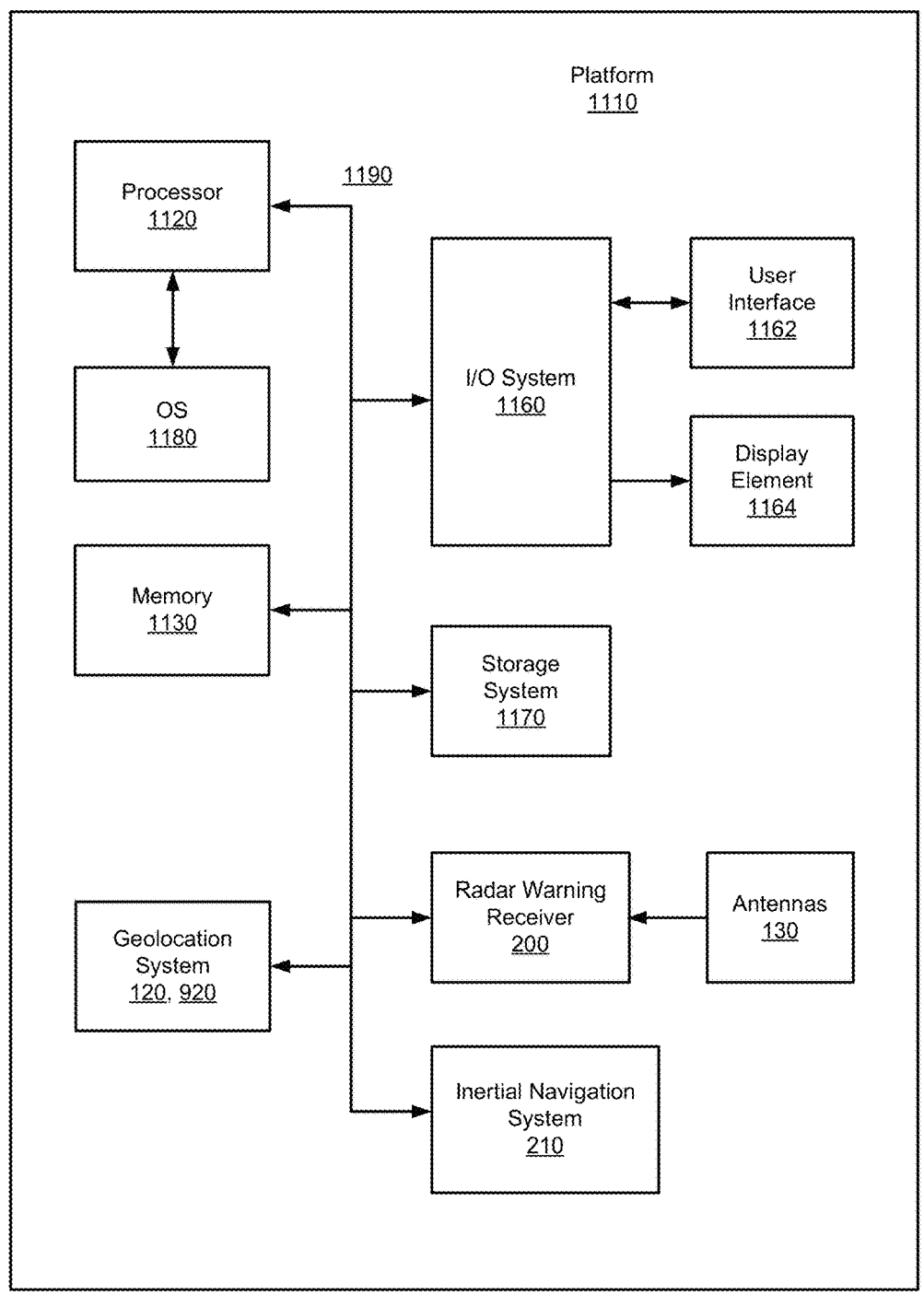
FIG. 11 is a block diagram schematically illustrating a platform employing the disclosed geolocation system, in accordance with certain embodiments of the present disclosure.

FIG. 11 is a block diagram 1100 schematically illustrating a platform 1110 employing the disclosed geolocation system, in accordance with certain embodiments of the present disclosure. In some embodiments, platform 1110 may be hosted on, or otherwise be incorporated into an aircraft, or the electronic systems of the aircraft.

In some embodiments, platform 1110 may comprise any combination of a processor 1120, a memory 1130, an input/output (I/O) system 1160, a user interface 1162, a display element 1164, a storage system 1170, geolocation systems 120 and/or 920, radar warning receiver (or other digital receiver) 200, antennas 130, and inertial navigation system 210. As can be further seen, a bus and/or interconnect 1190 is also provided to allow for communication between the various components listed above and/or other components not shown. Other componentry and functionality not reflected in the block diagram of FIG. 11 will be apparent in light of this disclosure, and it will be appreciated that other embodiments are not limited to any particular hardware configuration.

Processor 1120 can be any suitable processor, and may include one or more coprocessors or controllers, such as an audio processor, a graphics processing unit, or hardware accelerator, to assist in control and processing operations associated with platform 1110. In some embodiments, the processor 1120 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1120 may be implemented as a complex instruction set computer (CISC) or a reduced instruction set computer (RISC) processor.

Memory 1130 can be implemented using any suitable type of digital storage including, for example, flash memory and/or random access memory (RAM). In some embodiments, the memory 1130 may include various layers of memory hierarchy and/or memory caches as are known to those of skill in the art. Memory 1130 may be implemented as a volatile memory device such as, but not limited to, a RAM, dynamic RAM (DRAM), or static RAM (SRAM) device. Storage system 1170 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 1120 may be configured to execute an Operating System (OS) 1180 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1110, and therefore may also be implemented using any suitable existing or subsequently-developed platform.

I/O system 1160 may be configured to interface between various I/O devices and other components of platform 1110. I/O devices may include, but not be limited to, user interface 1162 and display element 1164. User interface 1162 may include other devices (not shown) such as a touchpad, keyboard, mouse, microphone and speaker, trackball or scratch pad, and camera. I/O system 1160 may include a graphics subsystem configured to perform processing of images for rendering on the display element 1164. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1120 or any chipset of platform 1110.

It will be appreciated that in some embodiments, some of the various components of platform 1110 may be combined or integrated in a system-on-a-chip (SoC) architecture. In some embodiments, the components may be hardware components, firmware components, software components or any suitable combination of hardware, firmware or software.

Geolocation system 120 is configured to locate a ground-based pulsed radar emitter based on precision TOA estimation, as described previously. Geolocation system 120 may include any or all of the circuits/components illustrated in FIGS. 1-4, 6, 8, and 9 as described above. These components can be implemented or otherwise used in conjunction with a variety of suitable software and/or hardware that is coupled to or that otherwise forms a part of platform 1110. These components can additionally or alternatively be implemented or otherwise used in conjunction with user I/O devices that are capable of providing information to, and receiving information and commands from, a user.

Various embodiments of platform 1110 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 1110 may comprise additional, fewer, or alternative subcomponents as compared to those included in the example embodiment of FIG. 11.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for emitter geolocation, the system comprising: a time difference of arrival (TDOA) calculation circuit to calculate TDOAs of ground emitter radar pulses, within a dwell period, the TDOA calculation for a given radar pulse being based on the difference between an estimate of a first time of arrival of the given radar pulse as received by a first long baseline interferometer (LBI) antenna and a second time of arrival of the given radar pulse as received by a second LBI antenna; a phase wrap disambiguation circuit to calculate an LBI phase wrap disambiguation factor based on (1) the calculated TDOAs, (2) an average of frequencies of the radar pulses received within the dwell period, and (3) an average of phase shifts of the radar pulses received within the dwell period, the phase shift of the given radar pulse being based on the difference between an estimate of a first phase of the given radar pulse as received by a first LBI antenna and a second phase of the given radar pulse as received by a second LBI antenna; and a curve calculation circuit to calculate an LBI cone angle using the LBI phase wrap disambiguation factor, and to map a curve of points onto an earth surface based on the calculated LBI cone angle, wherein a determination of the geolocation of the ground emitter is based on the curve of points.

In some cases, the estimate of time of arrival of the given radar pulse comprises: selecting data samples from a buffer in response to a radar pulse trigger, the selected data samples collected over a time period extending from an initial time prior to the trigger to a final time subsequent to the trigger; performing a Fast Fourier Transforms (FFT) on the data samples to estimate a coarse frequency; performing overlapped FFTs on the data samples and collecting amplitudes of the overlapped FFTs at frequency bins corresponding to the coarse frequency; performing median filtering on the collected overlapped FFT amplitudes; finding a peak FFT amplitude sample of the median filtered collected overlapped FFT amplitudes; averaging the collected overlapped FFT amplitudes that are within a first threshold of the peak FFT amplitude sample to generate an adjusted peak value; subtracting an offset value from the adjusted peak value to generate an adjusted peak offset; identifying a first sample time, of the median filtered collected overlapped FFT amplitudes, immediately preceding a sample time associated with the adjusted peak offset; identifying a second sample time, of the median filtered collected overlapped FFT amplitudes, immediately following the sample time associated with the adjusted peak offset; and interpolating between the first sample time and the second sample time to obtain the estimated time of arrival. In some such cases, the estimate of time of arrival of the given radar pulse further comprises: performing least mean square (LMS) adaptive filtering on the selected data samples to reduce noise, the LMS adaptive filtering employing noise data samples collected in a frequency bin adjacent to the estimated coarse frequency; performing median filtering to smooth the LMS adaptive filtered data samples; and applying a weighting function to the smoothed LMS adaptive filtered data samples.

In some cases, the dwell period is a first dwell period and the curve of points is a first curve of points, the system further comprising a curve intersection calculation circuit to generate an initial estimate of the geolocation of the ground emitter based on an intersection of the first curve of points with a second curve of points, the second curve of points generated by processing of the ground emitter radar pulses within a second dwell period. In some such cases, the system further comprises a geolocation optimization circuit to refine the initial estimate of the geolocation of the ground emitter using a Nelder-Mead optimization.

In some cases, the system further comprises an emitter classification circuit to calculate a radar pulse rise time and to classify the ground emitter based on the rise time.

Another example embodiment of the present disclosure provides a computer program product including one or more machine-readable mediums encoded with instructions that when executed by one or more processors cause a process to be carried out for emitter geolocation, the process comprising: calculating time difference of arrivals (TDOAs) of ground emitter radar pulses, within a dwell period, the TDOA calculation for a given radar pulse being based on the difference between an estimate of a first time of arrival of the given radar pulse as received by a first long baseline interferometer (LBI) antenna and a second time of arrival of the given radar pulse as received by a second LBI antenna; calculating an LBI phase wrap disambiguation factor based on (1) the calculated TDOAs, (2) an average of frequencies of the radar pulses received within the dwell period, and (3) an average of phase shifts of the radar pulses received within the dwell period, the phase shift of the given radar pulse being based on the difference between an estimate of a first phase of the given radar pulse as received by a first LBI antenna and a second phase of the given radar pulse as received by a second LBI antenna; calculating an LBI cone angle using the LBI phase wrap disambiguation factor; and mapping a curve of points onto an earth surface based on the calculated LBI cone angle, wherein a determination of the geolocation of the ground emitter is based on the curve of points.

In some cases, the computer program product of claim 7, further comprises the process of: selecting data samples from a buffer in response to a radar pulse trigger, the selected data samples collected over a time period extending from an initial time prior to the trigger to a final time subsequent to the trigger; performing a Fast Fourier Transforms (FFT) on the data samples to estimate a coarse frequency; performing overlapped FFTs on the data samples and collecting amplitudes of the overlapped FFTs at frequency bins corresponding to the coarse frequency; performing median filtering on the collected overlapped FFT amplitudes; finding a peak FFT amplitude sample of the median filtered collected overlapped FFT amplitudes; averaging the collected overlapped FFT amplitudes that are within a first threshold of the peak FFT amplitude sample to generate an adjusted peak value; subtracting an offset value from the adjusted peak value to generate an adjusted peak offset; identifying a first sample time, of the median filtered collected overlapped FFT amplitudes, immediately preceding a sample time associated with the adjusted peak offset; identifying a second sample time, of the median filtered collected overlapped FFT amplitudes, immediately following the sample time associated with the adjusted peak offset; and interpolating between the first sample time and the second sample time to obtain the estimated time of arrival. In some such cases, the process further comprises: performing least mean square (LMS) adaptive filtering on the selected data samples to reduce noise, the LMS adaptive filtering employing noise data samples collected in a frequency bin adjacent to the estimated coarse frequency; performing median filtering to smooth the LMS adaptive filtered data samples; and applying a weighting function to the smoothed LMS adaptive filtered data samples.

In some cases, the dwell period is a first dwell period and the curve of points is a first curve of points, the process further comprising generating an initial estimate of the geolocation of the ground emitter based on an intersection of the first curve of points with a second curve of points, the second curve of points generated by processing of the ground emitter radar pulses within a second dwell period. In some such cases, the process further comprises refining the initial estimate of the geolocation of the ground emitter using a Nelder-Mead optimization.

In some cases, the process further comprises calculating a radar pulse rise time and classifying the ground emitter based on the rise time.

Another example embodiment of the present disclosure provides a system for emitter geolocation, the system comprising: a time difference of arrival (TDOA) calculation circuit to calculate TDOAs of ground emitter radar pulses, within a dwell period, the TDOA calculation for a given radar pulse being based on the difference between an estimate of a first time of arrival of the given radar pulse as received by a first antenna and a second time of arrival of the given radar pulse as received by a second antenna; and a curve calculation circuit to calculate a cone angle based on an average of the TDOAs within the dwell period, and to map a curve of points onto an earth surface based on the calculated cone angle, wherein a determination of the geolocation of the ground emitter is based on the curve of points.

In some cases, the estimate of time of arrival of the given radar pulse comprises: selecting data samples from a buffer in response to a radar pulse trigger, the selected data samples collected over a time period extending from an initial time prior to the trigger to a final time subsequent to the trigger; performing a Fast Fourier Transforms (FFT) on the data samples to estimate a coarse frequency; performing overlapped FFTs on the data samples and collecting amplitudes of the overlapped FFTs at frequency bins corresponding to the coarse frequency; performing median filtering on the collected overlapped FFT amplitudes; finding a peak FFT amplitude sample of the median filtered collected overlapped FFT amplitudes; averaging the collected overlapped FFT amplitudes that are within a first threshold of the peak FFT amplitude sample to generate an adjusted peak value; subtracting an offset value from the adjusted peak value to generate an adjusted peak offset; identifying a first sample time, of the median filtered collected overlapped FFT amplitudes, immediately preceding a sample time associated with the adjusted peak offset; identifying a second sample time, of the median filtered collected overlapped FFT amplitudes, immediately following the sample time associated with the adjusted peak offset; and interpolating between the first sample time and the second sample time to obtain the estimated time of arrival.

In some such cases, the estimate of time of arrival of the given radar pulse further comprises: performing least mean square (LMS) adaptive filtering on the selected data samples to reduce noise, the LMS adaptive filtering employing noise data samples collected in a frequency bin adjacent to the estimated coarse frequency; performing median filtering to smooth the LMS adaptive filtered data samples; and applying a weighting function to the smoothed LMS adaptive filtered data samples.

In some cases, the dwell period is a first dwell period and the curve of points is a first curve of points, the system further comprising a curve intersection calculation circuit to generate an initial estimate of the geolocation of the ground emitter based on an intersection of the first curve of points with a second curve of points, the second curve of points generated by processing of the ground emitter radar pulses within a second dwell period. In some such cases, the system further comprises a geolocation optimization circuit to refine the initial estimate of the geolocation of the ground emitter using a Nelder-Mead optimization.

In some cases, the system further comprises an emitter classification circuit to calculate a radar pulse rise time and to classify the ground emitter based on the rise time.

Another example embodiment of the present disclosure provides a computer program product including one or more machine-readable mediums encoded with instructions that when executed by one or more processors cause a process to be carried out for emitter geolocation, the process comprising: calculating TDOAs of ground emitter radar pulses, within a dwell period, the TDOA calculation for a given radar pulse being based on the difference between an estimate of a first time of arrival of the given radar pulse as received by a first antenna and a second time of arrival of the given radar pulse as received by a second antenna; calculating a cone angle based on an average of the TDOAs within the dwell period; and mapping a curve of points onto an earth surface based on the calculated cone angle, wherein a determination of the geolocation of the ground emitter is based on the curve of points.

In some cases, the process further comprises: selecting data samples from a buffer in response to a radar pulse trigger, the selected data samples collected over a time period extending from an initial time prior to the trigger to a final time subsequent to the trigger; performing a Fast Fourier Transforms (FFT) on the data samples to estimate a coarse frequency; performing overlapped FFTs on the data samples and collecting amplitudes of the overlapped FFTs at frequency bins corresponding to the coarse frequency; performing median filtering on the collected overlapped FFT amplitudes; finding a peak FFT amplitude sample of the median filtered collected overlapped FFT amplitudes; averaging the collected overlapped FFT amplitudes that are within a first threshold of the peak FFT amplitude sample to generate an adjusted peak value; subtracting an offset value from the adjusted peak value to generate an adjusted peak offset; identifying a first sample time, of the median filtered collected overlapped FFT amplitudes, immediately preceding a sample time associated with the adjusted peak offset; identifying a second sample time, of the median filtered collected overlapped FFT amplitudes, immediately following the sample time associated with the adjusted peak offset; and interpolating between the first sample time and the second sample time to obtain the estimated time of arrival.

In some cases, the dwell period is a first dwell period and the curve of points is a first curve of points, the process further comprising generating an initial estimate of the geolocation of the ground emitter based on an intersection of the first curve of points with a second curve of points, the second curve of points generated by processing of the ground emitter radar pulses within a second dwell period. In some such cases, the process further comprises refining the initial estimate of the geolocation of the ground emitter using a Nelder-Mead optimization.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A system for emitter geolocation, the system comprising:
   a time difference of arrival (TDOA) calculation circuit to calculate TDOAs of ground emitter radar pulses, within a dwell period, the TDOA calculation for a given radar pulse being based on the difference between an estimate of a first time of arrival of the given radar pulse as received by a first long baseline interferometer (LBI) antenna and a second time of arrival of the given radar pulse as received by a second LBI antenna;
   a phase wrap disambiguation circuit to calculate an LBI phase wrap disambiguation factor based on (1) the calculated TDOAs, (2) an average of frequencies of the radar pulses received within the dwell period, and (3)

an average of phase shifts of the radar pulses received within the dwell period, the phase shift of the given radar pulse being based on the difference between an estimate of a first phase of the given radar pulse as received by a first LBI antenna and a second phase of the given radar pulse as received by a second LBI antenna; and a curve calculation circuit to calculate an LBI cone angle using the LBI phase wrap disambiguation factor, and to map a curve of points onto an earth surface based on the calculated LBI cone angle, wherein a determination of the geolocation of the ground emitter is based on the curve of points.

2. The system of claim 1, wherein the estimate of time of arrival of the given radar pulse comprises:

selecting data samples from a buffer in response to a radar pulse trigger, the selected data samples collected over a time period extending from an initial time prior to the trigger to a final time subsequent to the trigger;

performing a Fast Fourier Transforms (FFT) on the data samples to estimate a coarse frequency;

performing overlapped FFTs on the data samples and collecting amplitudes of the overlapped FFTs at frequency bins corresponding to the coarse frequency;

performing median filtering on the collected overlapped FFT amplitudes;

finding a peak FFT amplitude sample of the median filtered collected overlapped FFT amplitudes;

averaging the collected overlapped FFT amplitudes that are within a first threshold of the peak FFT amplitude sample to generate an adjusted peak value;

subtracting an offset value from the adjusted peak value to generate an adjusted peak offset;

identifying a first sample time, of the median filtered collected overlapped FFT amplitudes, immediately preceding a sample time associated with the adjusted peak offset;

identifying a second sample time, of the median filtered collected overlapped FFT amplitudes, immediately following the sample time associated with the adjusted peak offset; and interpolating between the first sample time and the second sample time to obtain the estimated time of arrival.

3. The system of claim 2, wherein the estimate of time of arrival of the given radar pulse further comprises:

performing least mean square (LMS) adaptive filtering on the selected data samples to reduce noise, the LMS adaptive filtering employing noise data samples collected in a frequency bin adjacent to the estimated coarse frequency;

performing median filtering to smooth the LMS adaptive filtered data samples; and applying a weighting function to the smoothed LMS adaptive filtered data samples.

4. The system of claim 1, wherein the dwell period is a first dwell period and the curve of points is a first curve of points, the system further comprising a curve intersection calculation circuit to generate an initial estimate of the geolocation of the ground emitter based on an intersection of the first curve of points with a second curve of points, the second curve of points generated by processing of the ground emitter radar pulses within a second dwell period.

5. The system of claim 4, further comprising a geolocation optimization circuit to refine the initial estimate of the geolocation of the ground emitter using a Nelder-Mead optimization.

6. The system of claim 1, further comprising an emitter classification circuit to calculate a radar pulse rise time and to classify the ground emitter based on the rise time.

7. A non-transitory computer program product including one or more machine-readable mediums encoded with instructions that when executed by one or more processors cause a process to be carried out for emitter geolocation, the process comprising:

calculating time difference of arrivals (TDOAs) of ground emitter radar pulses, within a dwell period, the TDOA calculation for a given radar pulse being based on the difference between an estimate of a first time of arrival of the given radar pulse as received by a first long baseline interferometer (LBI) antenna and a second time of arrival of the given radar pulse as received by a second LBI antenna;

calculating an LBI phase wrap disambiguation factor based on (1) the calculated TDOAs, (2) an average of frequencies of the radar pulses received within the dwell period, and (3) an average of phase shifts of the radar pulses received within the dwell period, the phase shift of the given radar pulse being based on the difference between an estimate of a first phase of the given radar pulse as received by a first LBI antenna and a second phase of the given radar pulse as received by a second LBI antenna;

calculating an LBI cone angle using the LBI phase wrap disambiguation factor; and mapping a curve of points onto an earth surface based on the calculated LBI cone angle, wherein a determination of the geolocation of the ground emitter is based on the curve of points.

8. The non-transitory computer program product of claim 7, the process further comprising:

selecting data samples from a buffer in response to a radar pulse trigger, the selected data samples collected over a time period extending from an initial time prior to the trigger to a final time subsequent to the trigger;

performing a Fast Fourier Transforms (FFT) on the data samples to estimate a coarse frequency;

performing overlapped FFTs on the data samples and collecting amplitudes of the overlapped FFTs at frequency bins corresponding to the coarse frequency;

performing median filtering on the collected overlapped FFT amplitudes;

finding a peak FFT amplitude sample of the median filtered collected overlapped FFT amplitudes;

averaging the collected overlapped FFT amplitudes that are within a first threshold of the peak FFT amplitude sample to generate an adjusted peak value;

subtracting an offset value from the adjusted peak value to generate an adjusted peak offset;

identifying a first sample time, of the median filtered collected overlapped FFT amplitudes, immediately preceding a sample time associated with the adjusted peak offset;

identifying a second sample time, of the median filtered collected overlapped FFT amplitudes, immediately following the sample time associated with the adjusted peak offset; and interpolating between the first sample time and the second sample time to obtain the estimated time of arrival.

9. The non-transitory computer program product of claim 8, the process further comprising:

performing least mean square (LMS) adaptive filtering on the selected data samples to reduce noise, the LMS adaptive filtering employing noise data samples collected in a frequency bin adjacent to the estimated coarse frequency;

performing median filtering to smooth the LMS adaptive filtered data samples; and applying a weighting function to the smoothed LMS adaptive filtered data samples.

10. The non-transitory computer program product of claim 7, wherein the dwell period is a first dwell period and the curve of points is a first curve of points, the process further comprising generating an initial estimate of the geolocation of the ground emitter based on an intersection of the first curve of points with a second curve of points, the second curve of points generated by processing of the ground emitter radar pulses within a second dwell period.

11. The non-transitory computer program product of claim 10, the process further comprising refining the initial estimate of the geolocation of the ground emitter using a Nelder-Mead optimization.

12. The non-transitory computer program product of claim 7, the process further comprising calculating a radar pulse rise time and classifying the ground emitter based on the rise time.

13. A system for emitter geolocation, the system comprising:

a time difference of arrival (TDOA) calculation circuit to calculate TDOAs of ground emitter radar pulses, within a dwell period, the TDOA calculation for a given radar pulse being based on the difference between an estimate of a first time of arrival of the given radar pulse as received by a first antenna and a second time of arrival of the given radar pulse as received by a second antenna; and a curve calculation circuit to calculate a cone angle based on an average of the TDOAs within the dwell period, and to map a curve of points onto an earth surface based on the calculated cone angle, wherein a determination of the geolocation of the ground emitter is based on the curve of points.

14. The system of claim 13, wherein the estimate of time of arrival of the given radar pulse comprises:

selecting data samples from a buffer in response to a radar pulse trigger, the selected data samples collected over a time period extending from an initial time prior to the trigger to a final time subsequent to the trigger;

performing a Fast Fourier Transforms (FFT) on the data samples to estimate a coarse frequency;

performing overlapped FFTs on the data samples and collecting amplitudes of the overlapped FFTs at frequency bins corresponding to the coarse frequency;

performing median filtering on the collected overlapped FFT amplitudes;

finding a peak FFT amplitude sample of the median filtered collected overlapped FFT amplitudes;

averaging the collected overlapped FFT amplitudes that are within a first threshold of the peak FFT amplitude sample to generate an adjusted peak value;

subtracting an offset value from the adjusted peak value to generate an adjusted peak offset;

identifying a first sample time, of the median filtered collected overlapped FFT amplitudes, immediately preceding a sample time associated with the adjusted peak offset;

identifying a second sample time, of the median filtered collected overlapped FFT amplitudes, immediately following the sample time associated with the adjusted peak offset; and interpolating between the first sample time and the second sample time to obtain the estimated time of arrival.

15. The system of claim 14, wherein the estimate of time of arrival of the given radar pulse further comprises:

performing least mean square (LMS) adaptive filtering on the selected data samples to reduce noise, the LMS adaptive filtering employing noise data samples collected in a frequency bin adjacent to the estimated coarse frequency;

performing median filtering to smooth the LMS adaptive filtered data samples; and applying a weighting function to the smoothed LMS adaptive filtered data samples.

16. The system of claim 13, wherein the dwell period is a first dwell period and the curve of points is a first curve of points, the system further comprising a curve intersection calculation circuit to generate an initial estimate of the geolocation of the ground emitter based on an intersection of the first curve of points with a second curve of points, the second curve of points generated by processing of the ground emitter radar pulses within a second dwell period.

17. The system of claim 16, further comprising a geolocation optimization circuit to refine the initial estimate of the geolocation of the ground emitter using a Nelder-Mead optimization.

18. The system of claim 13, further comprising an emitter classification circuit to calculate a radar pulse rise time and to classify the ground emitter based on the rise time.

19. A non-transitory computer program product including one or more machine-readable mediums encoded with instructions that when executed by one or more processors cause a process to be carried out for emitter geolocation, the process comprising:

calculating TDOAs of ground emitter radar pulses, within a dwell period, the TDOA calculation for a given radar pulse being based on the difference between an estimate of a first time of arrival of the given radar pulse as received by a first antenna and a second time of arrival of the given radar pulse as received by a second antenna;

calculating a cone angle based on an average of the TDOAs within the dwell period; and mapping a curve of points onto an earth surface based on the calculated cone angle, wherein a determination of the geolocation of the ground emitter is based on the curve of points.

20. The non-transitory computer program product of claim 19, the process further comprising:

selecting data samples from a buffer in response to a radar pulse trigger, the selected data samples collected over a time period extending from an initial time prior to the trigger to a final time subsequent to the trigger;

performing a Fast Fourier Transforms (FFT) on the data samples to estimate a coarse frequency;

performing overlapped FFTs on the data samples and collecting amplitudes of the overlapped FFTs at frequency bins corresponding to the coarse frequency;

performing median filtering on the collected overlapped FFT amplitudes;

finding a peak FFT amplitude sample of the median filtered collected overlapped FFT amplitudes;

averaging the collected overlapped FFT amplitudes that are within a first threshold of the peak FFT amplitude sample to generate an adjusted peak value;

subtracting an offset value from the adjusted peak value to generate an adjusted peak offset;

identifying a first sample time, of the median filtered collected overlapped FFT amplitudes, immediately preceding a sample time associated with the adjusted peak offset;
identifying a second sample time, of the median filtered collected overlapped FFT amplitudes, immediately following the sample time associated with the adjusted peak offset; and
interpolating between the first sample time and the second sample time to obtain the estimated time of arrival.

21. The non-transitory computer program product of claim 19, wherein the dwell period is a first dwell period and the curve of points is a first curve of points, the process further comprising generating an initial estimate of the geolocation of the ground emitter based on an intersection of the first curve of points with a second curve of points, the second curve of points generated by processing of the ground emitter radar pulses within a second dwell period.

22. The non-transitory computer program product of claim 19, the process further comprising refining the initial estimate of the geolocation of the ground emitter using a Nelder-Mead optimization.

* * * * *